(12) United States Patent
Uscinowicz

(10) Patent No.: US 7,982,664 B1
(45) Date of Patent: Jul. 19, 2011

(54) RADAR CALIBRATION STRUCTURE AND METHOD

(75) Inventor: Michael B. Uscinowicz, Hainesport, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 233 days.

(21) Appl. No.: 12/472,864

(22) Filed: May 27, 2009

(51) Int. Cl.
*G01S 7/40* (2006.01)
(52) U.S. Cl. ........................................ 342/174; 342/165
(58) Field of Classification Search .................. 342/174
See application file for complete search history.

(56) References Cited

U.S. PATENT DOCUMENTS 7,057,550 B1 * 6/2006 Aker ............................ 342/174
* cited by examiner

*Primary Examiner* — Thomas H Tarcza
*Assistant Examiner* — Matthew M Barker
(74) *Attorney, Agent, or Firm* — Duane Morris LLP

(57) ABSTRACT

A radar system with an array antenna includes various signal paths, including beamformers, extending between an exciter, a receiver, and the array antenna. The signal paths are calibrated by a method that includes frequency modulation of the exciter signals that reach the "antenna" and additional amplitude modulation of signals just as they enter the receiver. Leakage paths directly from the exciter to the receiver are unmodulated, those extending from the exciter through the beamformer are amplitude modulated, and only those reaching the "antenna" and returning to the receiver are both amplitude and frequency modulated. The receiver is tuned to receive only the "doubly-modulated" signals, which tends to reject leakage signals.

8 Claims, 9 Drawing Sheets

FOR Rx CALIBRATION MODE, THE RF SIGNAL GOES INTO "TRANSMIT INPUT" AND IS STEERED OUT TO "237" AND THEN UP TOWARD THE RADIATING ELEMENTS THEN BACK DOWN THE NORMAL Rx PATH EVENTUALLY BACK INTO THE MFA INTO 239 MidD AND THEN OUT "MidD"

RADAR CALIBRATION STRUCTURE AND METHOD

GOVERNMENT RIGHTS

This invention was made with Government Support under Contract No. W15P7T-06-C-T004 (Eq36) awarded by the Department of the Army. The Government has certain rights in this invention.

BACKGROUND OF THE INVENTION

Radar systems using shaped reflectors to form the beams have been in use for more than 50 years. In such radar systems, a high power transmitter is connected to a port of the reflector antenna, for transmitting a radar beam. Such systems are limited in their antenna beam slew rate by the inertia of the moving reflector, and are not ordinarily capable of modifying the beam shape without modification to the shape of the reflector. Modern radar systems are required to quasi-simultaneously generate plural radar antenna beams pointing in disparate directions, and for this reason tend to use phased-array antennas rather than reflector-type antennas. In a traditional phased-array antenna arrangement, the transmit signal is coupled from a single source or exciter to the individual antenna elements of the array by way of a power dividing beamformer network (beamformer or BFN). The power dividing beamformer applies a small fraction of the excitation energy to each antenna element. Beam steering is accomplished by modularized controllable phase shifters, and sometimes controllable attenuators, associated with the various antenna elements. When high transmitted power is desired, as may be the case when improved signal-to-noise ratio or range is desired, the exciter power can be increased. However, there are physical limitations to the amount of power that can practically or economically be generated. Even if the exciter power is maximized, the beamformer and other parts of the phased-array include lossy elements such as transmission lines, which attenuate the excitation signal. Thus, the power applied to each antenna element in a conventional phased-array antenna is reduced by the "power-dividing" nature of the beamformers, and is also reduced by the presence of unwanted transmission losses.

Active phased-array antennas were developed to adapt to or ameliorate the power-loss aspects of conventional phased-array antennas. In an active phased-array antenna, each antenna element of the antenna array is provided with a transmit-receive (TR) module which includes the controllable phase shifters for beam steering, and also includes its own excitation power amplifier. Low-power excitation is applied through the beamformer to the TR modules of the elements of the antenna array. The low power of the excitation makes it easy to distribute with small transmission paths, and the excitation, when it arrives at the TR module for transmission, is amplified by the excitation power amplifier. A major advantage of the active antenna array is that the high transmitter power is applied to the various TR modules in the form of direct voltage, rather than as a radio-frequency (RF) signal, which reduces the deleterious effects of RF leakage on the operation of the radar or other system using the active array antenna. In the past, the term "radio frequencies" was interpreted to mean a limited range of frequencies, such as, for example, the range extending from about 20 KHz to 2 MHz. Those skilled in the art know that "radio" frequencies as now understood extends over the entire frequency spectrum, including those frequencies in the "microwave" and "millimeter-wave" regions, and up to light-wave frequencies. Many of these frequencies are very important for commercial purposes, as they include the frequencies at which radar systems, global positioning systems, satellite cellular communications and ordinary terrestrial cellphone systems operate.

Since the beam direction of a phased array antenna depends upon the relative amplitudes and phases of the excitation signals applied to the antenna elements, unwanted amplitude and phase errors should desirably be minimized. While distribution of low-power excitation ameliorates unwanted leakage from the exciter to the receiver, the problem remains of causing the beam direction and shape to assume the desired configuration. For this purpose, the phase, and possibly the amplitude characteristics of the various paths are taken into account when setting up such an antenna or radar. The large number of signal paths in a large array antenna makes precalibration of the amplitude and phase of all of the paths difficult and expensive, and the characteristics of the paths may change after they are calibrated due to environmental effects, damage or even simple aging. Various schemes have been put forward for causing desired beam shape and direction control notwithstanding various amplitude and phase defects in the signal transmission paths.

The Counterfire Target Acquisition Radar, Enhanced AN/TPQ-36 operates at various different frequencies, and routes power among various antenna elements of an array by use of a hybrid arrangement. The radar system is precalibrated at each possible operating frequency by adjusting the phase shifts associated with the hybrid in a feedback manner to provide optimal performance, and the calibration values are stored. During normal operation, the calibration values of phase shift are selected and used for feedforward operation at each frequency.

Accurate characterization of the amplitude and phase of the signal or transmission paths ("lines") in a phased-array antenna requires high isolation in, between and among the various constituent parts of the system. Leakage paths of the characterization signal into unintended signal paths cause errors in the calibration. The smaller the desired calibration inaccuracy, the higher the required isolation.

Some phased-array radar systems, such as the Lockheed Martin Eq36 referred to above, have rigorous specifications which are selected to reduce leakage, and such rigorous specifications tend to drive up the cost of manufacture and may impact on periodic maintenance. FIG. 1 is a highly simplified block diagram 10 of the Eq36 radar system. While the explanation of the invention is directed toward the Eq36 system, the invention may be used wherever corresponding structures are found. In FIG. 1, a transmitter (TX) exciter is illustrated as a block 12. The transmitter exciter has broad capabilities for modulating an excitation signal, and in particular is capable of amplitude modulation (AM), frequency modulation (FM), phase modulation (PM), linear frequency modulation (LFM), and non-linear FM. Exciter block 12, as well as other portions of the radar 10, is controlled by way of a path 15 by a radar control computer (RCC), which is illustrated as a block 14. The controlled excitation from exciter 12 is applied in a transmit mode of operation, by way of a TX path 13, to a monitor feed amplifier (MFA) 18, which is also under control of the RCC 14. The MFA has sensitivity time control (STC) capability, as is common in radar systems for adjusting the receive gain to attenuate signals from close targets, to avoid receiver saturation. In a receive mode of operation, various receive signals are coupled from the monitor feed amplifier 18 to a receiver (RX), illustrated as a block 16. The receiver 16 has a broad instantaneous bandwidth, which can be controlled to virtually any individual frequency and with virtually any desired bandwidth, broad or narrow, within the instantaneous bandwidth. Receiver 16 receives radar receive signals from a monitor feed amplifier (MFA) 18 by way of paths designated together as 17. The various radar receive signals are the upper difference (UΔ), upper sum (UΣ), lower difference (LΔ), lower sum (LΣ), mid difference (MΔ), and mid sum (MΣ), as known in the art. The monitor feed amplifier (MFA) 18 is coupled by way of a beamformer 20 and transmission paths or cables 21 to an active antenna array 22. The active antenna array 22 includes at least phase shifters which are controlled by the radar control computer 14 to direct the electromagnetic radiation 23 of the antenna beams (not illustrated) in both the transmit and receive modes of operation. FIG. 1 also illustrates a "forward" signal flow direction arrow 96 and a "reverse" direction arrow 98.

FIG. 2A illustrates some details 200 of portions of the radar system 10 of FIG. 1. In FIG. 2A, an antenna array designated generally as 216 includes a plurality of arrays of eight antenna elements, together with some ancillary antenna elements. More particularly, the portion of the antenna array 216 illustrated in FIG. 1 includes an array of eight antenna elements designated 216a, another array of eight antenna elements designated 216b, . . . , and a further array of eight antenna elements designated 216h. Antenna array 216 includes some individual antenna elements, one of which is illustrated as $216_{AUX}$. Each antenna element of antenna array 216 includes a guided-wave port; the guided-wave ports are designated by the antenna element designation with the suffix "P." In FIG. 2A, beamformer 20 includes a 1:32 Monitor Feed Divider beamformer portion 236, a 32:2 Mid RX beamformer (BFN)& TX BFN 238, a 32:2 Upper RX BFN, a 32:2 Lower RX BFN 242, together referred to as beamformer portion 235, and a combination 8:3 3 vertical beam Blass network (BLASS is named after an individual) and 4:1 Monitor feed network 250. Also in FIG. 2A, active antenna array 22 includes 32 columns, each column of which includes a plurality of antenna coupling modules of a set of antenna coupling modules 209. Set 209 of antenna coupling modules as illustrated in FIG. 2A includes four "Octapacks" and an auxiliary (AUX) TR (Transmit-Receive) module $210_{AUX}$. The four octapacks of a single one of the 32 columns are illustrated in FIG. 2A as 210a, 210b, 210c, and 210d. Each octapack includes eight antenna coupling modules (not illustrated in FIG. 2A), and is connected to an array of eight antenna elements 216. The eight antenna elements to which octapack 210a is connected are designated together as 216a, the eight antenna elements to which octapack 210b is connected are designated together as 216b, the eight antenna elements to which octapack 210c is connected are designated together as 216c, and the eight antenna elements to which octapack 210d is connected are designated together as 216d. Transmit-Receive module $210_{AUX}$ is connected to a single antenna element $216_{AUX}$.

Within beamformer 20 of FIG. 2A, a set of signal paths designated generally as 251 interconnects beamformer portion 235 with beamformer portion 250. More particularly, first signal path 252 of set 251 interconnects combination 8:3 vertical beam Blass network (BLASS) and 4:1 Monitor feed network 250 with 1:32 Monitor Feed Divider network 236. A second signal path 254 interconnects combination 8:3 BLASS network and 4:1 Monitor feed network 250 with 32:2 Mid RX BFN & TX BFN 238. A third signal path 256 interconnects combination 8:3 BLASS network and 4:1 Monitor feed network 250 with 32:2 Lower RX BFN 242. Lastly, a fourth signal path 257 interconnects combination 8:3 BLASS network and 4:1 Monitor feed network 250 with 1:32 Monitor Feed Divider network 236.

In FIG. 2A, various signal paths or lines, designated generally as "RF Cables" 21, connect the beamformer network 20 to the 32 columns, each of eight antenna coupling modules, of the active antenna array 22. Those skilled in the art will understand that the term "cables" should be interpreted as being transmission lines or paths of any sort. Among these transmission paths, some are represented in FIGS. 2A and 3 by dash lines; these are "Monitor Feed Paths", which are precalibrated as to their amplitude and phase characteristics. The precalibration of only a few of the signal paths (the monitor feed paths) avoids the cost and complexity of initially calibrating all the paths, of which there may be thousands. Once the monitor feed paths are calibrated, the remainder of the signals paths can be calibrated by the method described herein.

FIG. 3 is a simplified representation of the contents of one of the octapacks or 8-TR-module blocks of FIG. 2A, together with the associated set of eight antenna elements. For definiteness, module 210b is represented in FIG. 3, with its array 216b of antenna elements. In FIG. 2A, the three transmission paths which interconnect octapack 210b with combination 8:3 BLASS) network and 4:1 Monitor feed network 250 are 212c, 212d, and 214b. These same transmission paths 212c, 212d, and 214b appear at the left of FIG. 3. Each of transmission paths 212c and 212d is connected to a set of four antenna coupling networks. More particularly, transmission path 212c is connected to a set 310 of antenna coupling networks (ACNs) 310a, 310b, 310c, and 310d. Transmission path 212d is connected to antenna coupling networks 310e, 310f, 310g, and 310h. Antenna coupling network 310a includes a TR module 312a (one of a set 312 of TR modules) which is connected to transmission path 212c, and which is also connected by a pair of conductors to two ports of a circulator 314a. A third port of circulator 314a is connected to a low-pass filter 318a and a sampler or directional coupler 320a of a set 320 of directional couplers. The through path of directional coupler 320a is connected at an antenna port 316baP to a first antenna element 316ba, and the tap port is connected to monitor feed path 214b. The circulators 314a, 314b, . . . of FIG. 3 are part of a set 314 of circulators, the filters 318a, 318b, . . . , are part of a set 318 of circulators, and directional couplers 320a, 320b, . . . , are part of a set 320 of directional couplers.

Similarly, antenna coupling network 310b of FIG. 3 includes a TR module 312b which is connected to transmission path 212c, and which is also connected by a pair of conductors to two ports of a circulator 314b. A third port of circulator 314b is connected to a low-pass filter 318b and a sampler or directional coupler 320b. The through path of directional coupler 320b is connected at an antenna port 316bbP to a second antenna element 316bb. Antenna coupling network 310c of set 310 includes a TR module 312c which is connected to transmission path 212c, and which is also connected by a pair of conductors to two ports of a circulator 314c. A third port of circulator 314c is connected to a low-pass filter 318c and a sampler or directional coupler 320c. The through path of directional coupler 320c is connected at an antenna port 316bcP to a third antenna element 316bc. Antenna coupling network 310d includes a TR module 312d which is connected to transmission path 212c, and which is also connected by a pair of conductors to two ports of a circulator 314d. A third port of circulator 314d is connected to a low-pass filter 318d and a sampler or directional coupler 320d. The through path of directional coupler 320d is connected at an antenna port 316bdP to a further antenna element 316bd. Antenna coupling network 310e includes a TR module 312e which is connected to transmission path 212c, and which is also connected by a pair of conductors to two ports of a circulator 314e. A third port of circulator 314e is connected to a low-pass filter 318e and a sampler or directional coupler 320e. The through path of directional coupler 320e is connected at an antenna port 316beP to a further antenna element 316be. Antenna coupling network 320f includes a TR module 312f which is connected to transmission path 212c, and which is also connected by a pair of conductors to two ports of a circulator 314f. A third port of circulator 314f is connected to a low-pass filter 318f and a sampler or directional coupler 320f. The through path of directional coupler 320f is connected at an antenna port 316bfP to a further antenna element 316bf. Antenna coupling network 310g includes a TR module 312g which is connected to transmission path 212c, and which is also connected by a pair of conductors to two ports of a circulator 314g. A third port of circulator 314g is connected to a low-pass filter 318g and a sampler or directional coupler 320g. The through path of directional coupler 320g is connected at an antenna port 316bgP to a further antenna element 316bg. Antenna coupling network 310h includes a TR module 312h which is connected to transmission path 212c, and which is also connected by a pair of conductors to two ports of a circulator 314h. A third port of circulator 314h is connected to a low-pass filter 318h and a sampler or directional coupler 320h. The through path of directional coupler 320h is connected at an antenna port 316bhP to a further antenna element 316bh. All of the antenna coupling modules of set 310 of FIG. 3 are controlled by RCC 14 by way of path 15.

FIG. 4A is a simplified diagram in schematic and block form, illustrating details of a TR module of FIG. 3, and FIG. 4B illustrates the equivalence of different directional coupler symbols. In FIG. 4A, the particular one of the TR modules is 312c. As illustrated, the interconnection transmission path 212c is connected to an input-output port 412io of a common leg circuit (CLC) block 412. The CLC can apply gain and phase changes in both the transmit and receive modes of operation with the existing EQ36 clock and control signals. In a radar transmit mode of operation, excitation is delivered by way of path 212c and a transmit output port 412o1 of CLC 412 to a driver amplifier 414. Amplifier 414, in turn, drives a "high-power amplifier" (HPA) 416, which includes first and second 3 dB splitters or directional couplers 418 and 420 and amplifier portions 416a and 416b. The high-power amplifier can be biased ON and OFF by the radar control computer (RCC) or processor, thereby providing an on-off "switching" function in each forward path. The output of HPA 416 is coupled by a path 430 to a port of circulator 314c of FIG. 3. In a transmit mode of operation, the excitation applied to HPA 416 is amplified and applied by way of circulator 314c (FIG. 3), filter 318c, and directional coupler 320c to the guided-wave port 316bcP of antenna element 316bc for transduction to the form of unguided radiation, which propagates into space. In a receive mode of operation, free-space radiation arrives at the various antenna elements, including antenna element 316bc. That radiation received by antenna element 312bc is transduced to guided-wave form and is applied through directional coupler 320c, filter 318c, circulator 314c, and path 432 to low-noise amplifier (LNA) 422 for amplification. As with the HPA, the LNA can provide an ON/OFF function under the control of the RCC. The amplified received signal is applied through port 412i1 of common leg circuit (CLC) 412 and thence onto transmission path 212c.

Common leg circuit (CLC) 412 of FIG. 4A includes a single-pole, double-throw switch designated 450 and illustrated as a mechanical switch. As mentioned, those skilled in the art know that such mechanical switches are only symbolic and used for understanding the operation, and that semiconductor or solid-state switches are used instead. The mechanical portions of switch 450 include a common port or terminal 450c, to which one end of a movable element 450m is attached. Movable element 450m can be moved in the directions indicated by a curved, two-headed arrow, so as to contact either a first individual or independent port or terminal $450_1$ or a second individual port $450_2$, to thereby provide communication between the common port 450c and the selected one of the individual ports. The state of switch 450, and of other switches in CLC 412, are controlled by way of path 15 by the radar control computer (14 of FIG. 1). Port $450_1$ of switch 450 of FIG. 4 is connected to an individual port $452_1$ of a single-pole, double-throw switch 452, and port 4502 is connected by a path 460 to an individual port $458_2$ of a single-pole, double-throw switch 458. Individual port $452_2$ of switch 452 is connected by way of path 420 to receive return or reflected signals from low-noise amplifier 412. The common port 452c of switch 452 is connected to a block 454, which includes at least one of amplitude (A) or phase ($\phi$) control, also under the control of RCC 14. The amplitude and phase-controlled signal is applied from block 454 to an amplifier illustrated as 456. The amplified signal from amplifier 456 is applied to the common port 458c of a single-pole, double-throw switch 458. Movable element 458m of switch 458 can contact port $458_1$ or $458_2$. Port $458_1$ is connected to output port 412o1 of CLC 412, and port $458_2$, as mentioned, is connected to switch 450.

In operation of CLC 412 of FIG. 4, the state of switches 450, 452, and 458 is as illustrated in the transmit mode of operation. During transmission, RF from the exciter arrives at CLC 412 by way of path 212c, and is coupled through switches 450 and 452 and through amplitude and phase control block 454 and amplifier 456 to the common port of switch 458. Switch 458 routes the RF signal by way of driver 414 and high power amplifier 416 to the associated antenna(s) by way of circulator 314c. In a receive mode of operation, the positions of the movable elements of switches 450, 452, and 458 are reversed from that illustrated. During reception, the antenna signals received by the associated antenna(s) are routed by way of circulator 314c and LNA 412 to port $452_2$ of switch 452, thence through amplitude and phase control block 454 and amplifier 456 to port $458_2$ of switch 358. From port $458_2$ of switch 358, the return signals flow by path 460 to port $450_2$ of switch 452, and by way of movable element 452m to common port 450c. Thus, in the transmit mode the exciter signal is routed by the HPA 416 to the associated antenna element, and in the receive mode the received signal is routed by LNA 422 back to conductor 212c. Conductor 212c ultimately routes the signal to receiver 16 of FIG. 1.

FIG. 5 is a simplified diagram in block and schematic form illustrating details of antenna coupler $210_{AUX}$ of FIG. 2A. In FIG. 5, antenna coupler 210AUX receives signal from path 213, couples that signal through a TR module $312_{AUX}$, which is identical to that of FIG. 4A. In short, the "forward" signal flows through the TR module and through path 530 to a port of a circulator $314_{AUX}$. The forward signal is circulated to filter $320_{AUX}$ and then through directional coupler 520 to an antenna port. In receive mode of operation, the received signal flows through directional coupler 520, filter $320_{AUX}$, circulator $314_{AUX}$, and through the "reverse" signal path of TR module $312_{AUX}$.

Monitor feed amplifier 18 of FIG. 2A also includes a plurality of receive signal amplifiers for amplifying the receive signals from the antenna coupling modules 22. More particularly, a receive amplifier 234a amplifies the AUXiliary signal received from a antenna coupling module 210AUX by way of signal path 213 to produce AUX receive signal for application to the AUX port of receiver 16, a receive amplifier 234c amplifies the receive signal received from a beamformer 238 by way of signal path 239MΣ to produce mid Σ receive signal for application to the MΣ port of receiver 16, a receive amplifier 234d amplifies the receive signal received from beamformer 240 by way of signal path 241UΔ to produce upper Δ receive signal for application to the UΔ port of receiver 16, a receive amplifier 234e amplifies the receive signal received from beamformer 240 by way of signal path 241UΣ to produce upper Σ receive signal for application to the UΣ port of receiver 16, a receive amplifier 234f amplifies the receive signal received from beamformer 242 by way of signal path 243LΔ to produce lower Δ receive signal for application to the LΔ port of receiver 16, and a receive amplifier 234g amplifies the receive signal received from beamformer 242 by way of signal path 243LΣ to produce lower Σ receive signal for application to the LΣ port of receiver 16.

In FIG. 2A, the monitor feed amplifier 18 includes an MFA Switch Arrangement 201, which can take on four operating modes. These modes are transmit and receive in the radar mode and transmit and receive calibration mode, including one for receive and one for transmit. There is also a "loopback" mode or path. MFA switch arrangement 201 is coupled by a monitor feed path 237 to 1:32 Monitor Feed Divider 236, by a paths 239 midΔ and 239t to 32:2 Mid Rx BFN & Tx BFN 238. MFA Switch Arrangement 201 also receives exciter (Tx) signal at MFA port $18i_1$. FIG. 2B illustrates details of the Monitor Feed Amplifier (MFA) Switch Arrangement 201 of FIG. 2A. FIG. 2B shows the state of the switch arrangement 201 in the receive calibration mode of operation, while FIG. 2C shows the state of the switch arrangement 201 in the transmit calibration mode of operation. In the MFA switch arrangement 201 of FIG. 2B, a directional coupler 224 includes a through path extending from a port $224_1$ to a port $224_2$, and has a bidirectional tap port $224_3$. In MFA switch arrangement 201, the signal from the 239 mid Δ path is applied through a sensitivity time control (STC) gain block $232_1$ and by way of the through path of directional coupler 224, an amplifier $229_1$, a second STC gain circuit $232_2$, and another amplifier $229_2$ to an individual terminal $230_1$ of a switch 230. STC is well known in the radar arts, and is used to modulate the gain of the radar system so as to reduce the magnitude of return (clutter) signals from nearby targets. Switch 230 is symbolically illustrated as a mechanical switch, as is conventional for purposes of explanation, but those skilled in the art know that electronic or solid-state switches are used in actual practice. Switch 230 as illustrated includes a common terminal 230c which is coupled by a path $17_1$ to the mid Δ port of receiver 16 of FIG. 1. A movable element 230m is coupled at one end to common port 230c, and the movable end can make contact with either terminal $230_1$ or $230_2$. In the illustrated state of switch 230, movable element 230m connects terminal or port 230c to port $230_1$.

In FIG. 2B, transmit (TX) or exciter signals are applied by way of path 13 and port $18i_1$ and by way of an exciter signal amplifier including amplifier elements $220_1$ and $220_2$ to the common port 221c of a single-pole, double-throw switch 221. Switch 221 includes a movable element 221m which makes continuous contact with common port 221m and can make contact with one or the other of terminals or ports $221_1$ and $221_2$. In the position of switch 221 illustrated in FIG. 2B, the exciter signals are routed to a terminal $226_2$ of a switch 226. In the other position of switch 221, the movable element 221m connects the common terminal 221c to terminal $221_2$. In such a position, exciter signals flow from switch 221, and through an amplifier $220_3$ to directional coupler port $222_1$ of directional coupler 222. Directional coupler 222 routes a portion of the exciter signal by way of the through path to terminal $222_2$ and path 239t to beamformer portion 238, and another portion to tap port $222_3$. The portion of the exciter signal leaving tap port $222_3$ of directional coupler 222 starts on the loopback path, and is routed by way of a high-isolation single-pole single-throw switch 225, illustrated in the nonconnecting or OPEN state, to the tap of a further directional coupler 224. Additionally, in FIG. 2B, switch 226 includes a movable element 226m continuously connected to a common terminal 226c. A further conductor in FIG. 2B connects terminal $230_2$ of switch 230 to a terminal $226_1$ of switch 226, and common terminal 226c is connected by conductor 237 to a beamformer portion 236.

FIG. 2C illustrates the MFA Switch 201 of FIG. 2B in the alternative switch condition useful for calibration of the transmit mode.

Calibration of the transmission lines and beamformers in the transmit mode of operation of the prior art arrangement of FIGS. 2A, 2B, 2C, 3, 4A, and 5 is or was performed by injecting an RF signal from the exciter (12 of FIG. 1) into the Transmit port $18i_1$ of MFA 18 by way of path 13, with the switches of MFA Switch Arrangement 201 set as illustrated in FIG. 2C. The RF signal flows through amplifiers $220_1$ and $220_2$, through switch 221 and amplifier $220_3$, by way of the through path of directional coupler 222 and port 18io to transmission path 239t. The exciter signal coupled onto directional coupler tap port 2223 is blocked from further progress by high isolation switch 225 in its OPEN state. The exciter signal leaving the through path of directional coupler 222 at port $222_2$ exits the MFA by path 239t of port 18io, then goes through the Tx Beamformer 238, toward the front of the array, and through the 8:3 Blass network 250, into an Octapack, represented by 210b of FIG. 3, and through the CLC, represented by s412 of FIG. 4A, through the HPA 416 of FIG. 4A, the circulator 314C of FIG. 3, the filter of set 314, and is then coupled by way of a directional coupler (of set 320) to a Monitor Feed Path 214 of FIG. 2A (214b in FIG. 3) to start its journey toward the receiver 16 of FIG. 1. There is one monitor feed path for each octapack. The exciter signal returning toward the receiver is applied from a path 214 (path 214b illustrated in FIG. 3) through the 4:1 monitor feed portion of Blass network 250, by way of path 257 into the 1:32 Monitor Feed Divider 236, and by way of path 237 into the MFA Switch Arrangement 201 of MFA 18. Within the MFA Switch Arrangement 201, the exciter signal flows through switch 226 in the state illustrated in FIG. 2C, and through switch 230 and then out the Mid Δ port of the MFA and into the receiver 16. The receiver 16 would then measure the amplitude and phase of the received signal and compare it to the magnitude and phase of the exciter signal that was first sent in preparation for making correction data. As an alternative, the loopback signal path can be enabled, which amounts closing high-isolation switch 225 to apply the exciter signal to the return path. This process would be repeated for all the antenna elements. Then the collected corrected data would be used to correct (via the CLC) each individual element Transmit path to form equal phase and amplitude (or whatever desired beamsteering phase and taper was required at each element).

Similarly, in calibrating the antenna for Receive mode, a known RF signal (magnitude and phase) would be injected into the MFA (by the same port $18i_1$ as in the case of Transmit calibration mode), however the MFA Switch Arrangement 201 is in the receive state represented by FIG. 2B. The exciter signal flows through amplifiers $220_1$ and $220_2$, and by way of switches 221 and 226 to path 237 at port 18io. The exciter signal applied from switch 226 to path 237 flows to the 1:32

Monitor Feed Divider 236, up to the 1:4 250, up to the Octapack by way of a the monitor feed paths such as 214a, 214b, 214c, and 214d, and is coupled over a directional coupler of set 320 of directional couplers, through a filter of set 318 of filters, through a circulator of set 314 of circulators, through the LNA 422 and then the CLC 412, through the 8:3 Blass 250), into the 32:2 Middle Beamformer 238, into the MFA (different port than in Transmit calibration) 18 and then out the MFA MidΔ (same port as Transmit calibration) and finally into the receiver 16. Again the magnitude and phase of this signal would be measured and compared to the magnitude and phase of the signal from the exciter, sampled by way of the loopback path, to prepare for element path Receive mode correction. This would be repeated for the transmission paths related to each antenna element, and the collected corrected magnitude and phases would be applied to the CLC together with the desired magnitude and phases to correct each individual element Receive path to form equal phase and amplitude or whatever desired beamsteering phase and taper was required at each element. It should be noted that the calibration signal need not be transmitted from the antenna array, because the power amplifier 416 can be biased OFF. The LNA 422 can also be biased OFF to prevent amplification of multiple signals in the reverse direction.

Improved radar calibration arrangements and methods are desired.

SUMMARY OF THE INVENTION

A method according to an aspect of the invention is for calibrating the transmit portion or aspect of an apparatus. The apparatus includes an array antenna which includes a plurality of guided-wave ports. The array antenna is for transducing electromagnetic signals between guided and unguided modes. The apparatus further includes an exciter for generating RF excitation or excitation signals for calibration and operation of the apparatus. A first sampling coupler includes a tap port and an output port. The first sampling coupler is coupled to the exciter for generating a local sample of the excitation at the tap port, and for passing most of the excitation to the output port of the first sampling coupler. A tunable receiver includes an input port, which is controllably coupled to the first sampling coupler for receiving the local sample of the excitation. The receiver has the capability of comparing at least the phase of the local sample of the excitation with calibration signals applied to the input port (midΔ) of the receiver. The apparatus also includes at least one phase modulator and at least one amplitude modulator. A beamformer includes a first port coupled to the output port of the first sampling coupler, for receiving the excitation signals passing through the first sampling coupler from the exciter. The beamformer also includes a plurality of second ports coupled to a plurality of signal paths, for distributing the excitation signals as forward excitation among the plurality of signal paths to a phase modulator. The beamformer also includes monitor feed paths for coupling frequency-modulated excitation signals in a reverse direction to the amplitude modulator. A direction-reversing directional coupler is coupled to the phase modulator and to the beamformer for propagating frequency modulated excitation in the reverse direction through the monitor feed paths of the beamformer. The direction-reversing coupler also includes a port coupled to an antenna guided-wave port. The method comprises the steps of operating the exciter to generate the excitation or excitation signals, whereby the excitation signals flow through the first sampling coupler to produce reference excitation at the tap port and to also produce forward excitation. The reference excitation is coupled to the receiver. The forward excitation is coupled through the beamformer to the phase modulator. The phase modulator is controlled to frequency modulate the excitation distributed thereto, to thereby produce the frequency-modulated excitation, which frequency-modulated excitation flows from the phase modulator to the direction-reversing directional couplers, and by way of the monitor feed paths of the beamformer to the amplitude modulator. The excitation signals flowing through the amplitude modulator, including the frequency-modulated excitation signals, are amplitude-modulated, to thereby generate amplitude-modulated excitation signals, some of which are doubly-modulated and some of which are not doubly-modulated. The amplitude-modulated excitation signals from the amplitude modulator are coupled to the input port of the receiver. The receiver is controlled to respond to the doubly-modulated excitation signals and to not respond to the not-doubly-modulated excitation, and to compare electrical characteristics of the reference excitation and the doubly-modulated excitation to thereby produce forward-direction correction values. The apparatus is operated in a transmit mode in which the phase modulators are commanded with values which are modified in response to, with or by the correction values. The step of coupling the reference excitation to the receiver includes the step of operating switches to provide a path between the tap port and the input port of the tunable receiver. In one mode of the method, the step of comparing electrical characteristics includes the step of subtracting from measured forward-plus-reverse characteristics the electrical characteristics of the monitor feed paths.

A method according to another aspect of the invention is for calibrating the receive aspect of an apparatus, where the apparatus includes an array antenna including a plurality of guided-wave ports. The array antenna is for transducing electromagnetic signals between guided and unguided modes. An exciter generates RF calibration excitation or excitation signals for calibration of the apparatus. A first sampling coupler includes a tap port and an output port. The first sampling coupler is coupled to the exciter for generating a local sample of the calibration excitation at the tap port. A tunable receiver includes an input port controllably coupled to the tap port of the first sampling coupler for receiving the sample of the calibration excitation. The apparatus includes at least one phase modulator. A direction-reversing directional coupler includes a first through port coupled to an antenna guided-wave port and a second through port coupled to the phase modulator, and also includes a direction reversing port. The apparatus also includes an amplitude modulator. A beamformer includes a forward-direction monitor feed path coupled to the exciter and to the direction reversing port of the directional coupler, for receiving the calibration excitation from the exciter and for distributing the excitation to the direction reversing port of the directional coupler, the beamformer also including a plurality of receive signal paths for coupling calibration excitation and receive signals in a reverse direction to the amplitude modulator. The method comprises the steps of operating the exciter to generate the calibration excitation, whereby the calibration excitation flows through the first sampling coupler to produce reference excitation at the tap port. The reference excitation is coupled from the first sampling coupler to the port of the receiver. The calibration excitation signals are coupled in a forward direction through monitor feed paths of the beamformer to the direction-reversing port of the directional coupler, for generating reverse-direction calibration excitation signals. The reverse-direction calibration excitation signals are applied to the phase modulator. The phase modulator is controlled to frequency modulate the reverse-direction calibration excitation signals applied thereto, to thereby produce reverse-direction frequency-modulated calibration excitation signals. The reverse-direction frequency-modulated calibration excitation signals are coupled through a receive signal path of the beamformer to the amplitude modulator. The amplitude modulator is controlled to amplitude-modulate calibration excitation signals flowing therethrough, including the frequency-modulated calibration excitation signals, to thereby generate amplitude-modulated calibration excitation signals, some of which are doubly-modulated and some of which are not doubly-modulated. The amplitude-modulated calibration excitation signals are coupled from the amplitude modulator to the input port of the receiver. The receiver is controlled to respond to the doubly-modulated excitation signals and to not respond to the not-doubly-modulated excitation, and to compare electrical characteristics of the reference excitation signals and the doubly-modulated excitation signals to thereby produce correction values. The apparatus is operated in a receive mode in which the phase modulator is commanded with values which are modified in response to or by the correction values. In a particular mode of the method, the correction values are modified by subtracting the characteristics of the forward monitor feed path.

DESCRIPTION OF THE INVENTION

Figure 1:
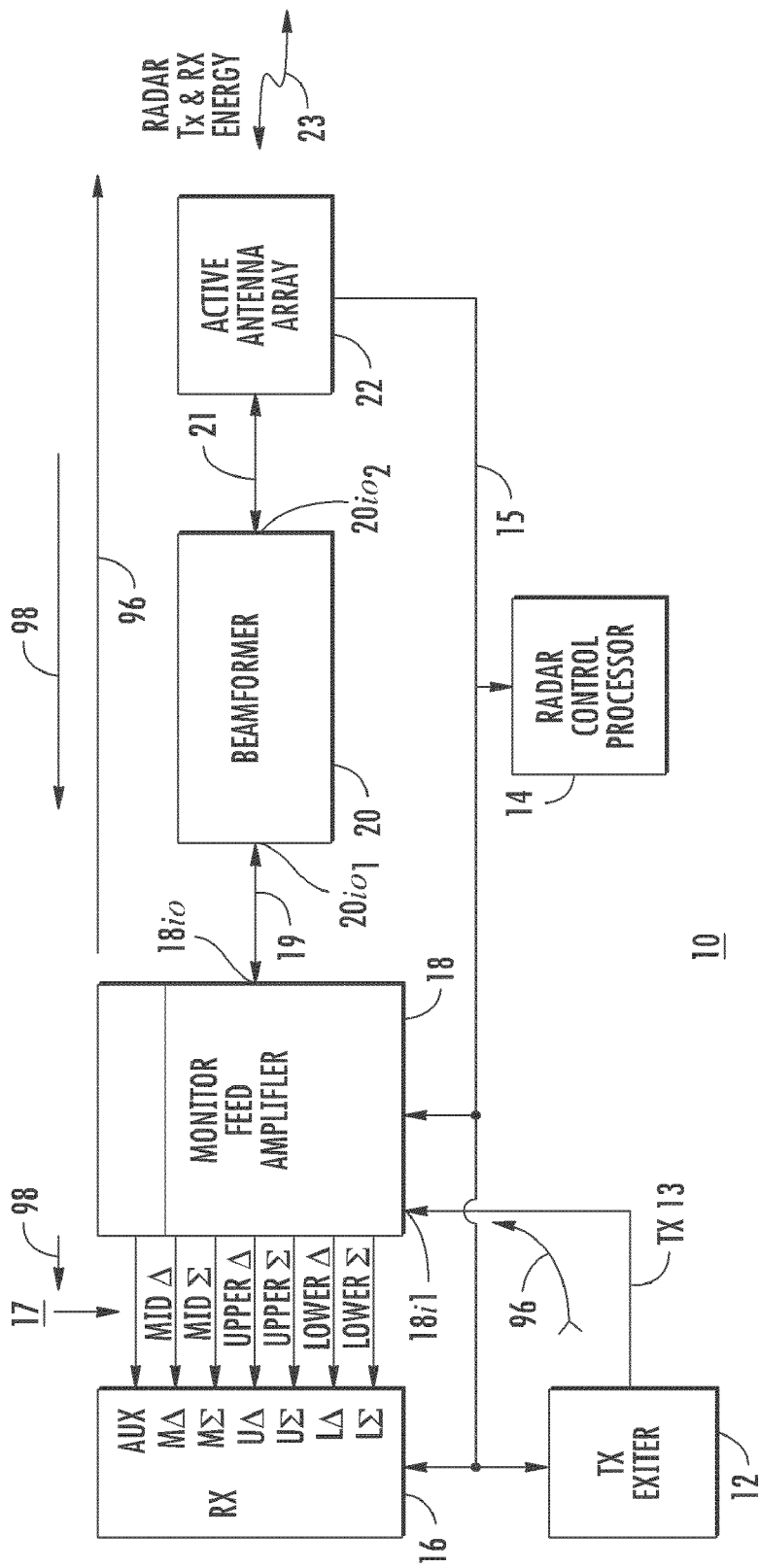
FIG. 1 is a simplified representation of a prior-art radar system including monitor feed amplifier, beamformer, and an active antenna array.
Figure 6:
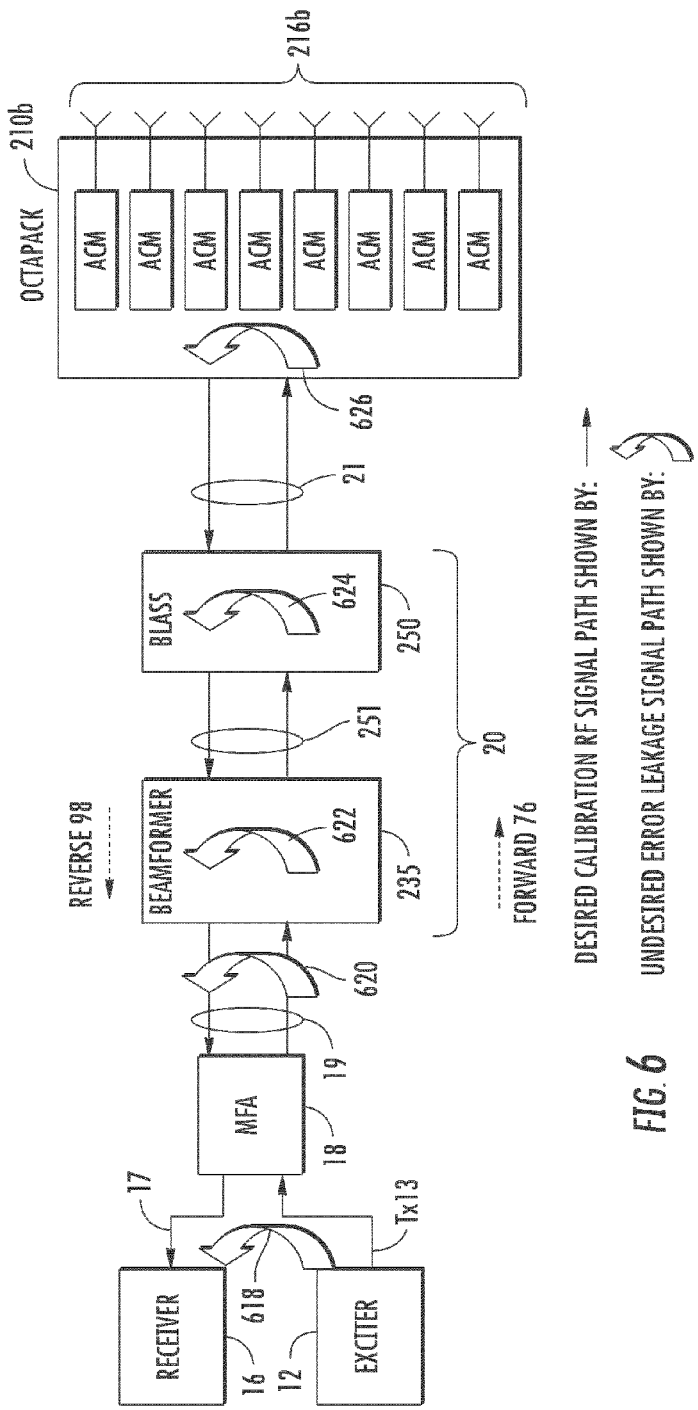
FIG. 6 is a notional representation of a functional portion of the radar of FIG. 1, showing signal leakage paths which can be expected during calibration of the paths of the radar.

FIG. 6 is a simplified or notional representation of the desired calibration paths and undesired leakage paths in the radar system of FIG. 1. Elements of FIG. 6 corresponding to those of FIGS. 1 and 2 are designated by like reference numerals. In FIG. 6, the desired calibration signal paths are indicated by straight solid-line arrows, and undesired signal leakage paths by curled arrows. Directional arrows 96 and 98 are dashed. More particularly, the desired calibration signal paths include, starting from the exciter 12, the path 13, the MFA 18, path 19, beamformer portion 235, paths 251, Blass portion 250, and paths 21 to the antenna coupling networks of the one illustrated octapack 210b. That is to say, that in order to characterize each of the forward paths 96 (from exciter toward antennas) and reverse paths 98 (from antennas toward receiver), excitation signal is transmitted through the forward paths, coupled to a return path in an antenna coupling element, and returned to the receiver 16 through a return path. The coupling of the forward signal from the forward path into a return path is accomplished by a controllable path including an ON-OFF controllable amplifier (or equivalently a switch) and a directional coupler, such as a directional coupler of set 320 of directional couplers of FIG. 3. When the calibration signals are generated by the exciter 12 of FIG. 6 and transmitted toward the MFA 18, unwanted leakage unavoidably occurs which is illustrated by the leakage path represented by curled arrow 618. Similarly, when the desired calibration signal is transmitted in the forward direction from MFA 18 to beamformer 20 by way of paths 19, unavoidable leakage occurs between the forward and reverse paths, as suggested by curled arrow 620. Leakage between the forward and reverse paths also occurs in beamformer portions 235 and 250, and in paths 251, as suggested by curled arrows 622 and 624. Further leakage occurs as the forward signal traverses paths 21 between beamformer 20 and the octapack, and within the various portions of the octapack, as suggested by curled arrow 626. All these unwanted leakage paths make it very difficult to distinguish the desired signals from the leakage signals, and results in impaired calibration. The leakage of signals also occurs when a calibration signal is introduced into the signal reverse path at a location near the antenna elements.

Figure 2A:
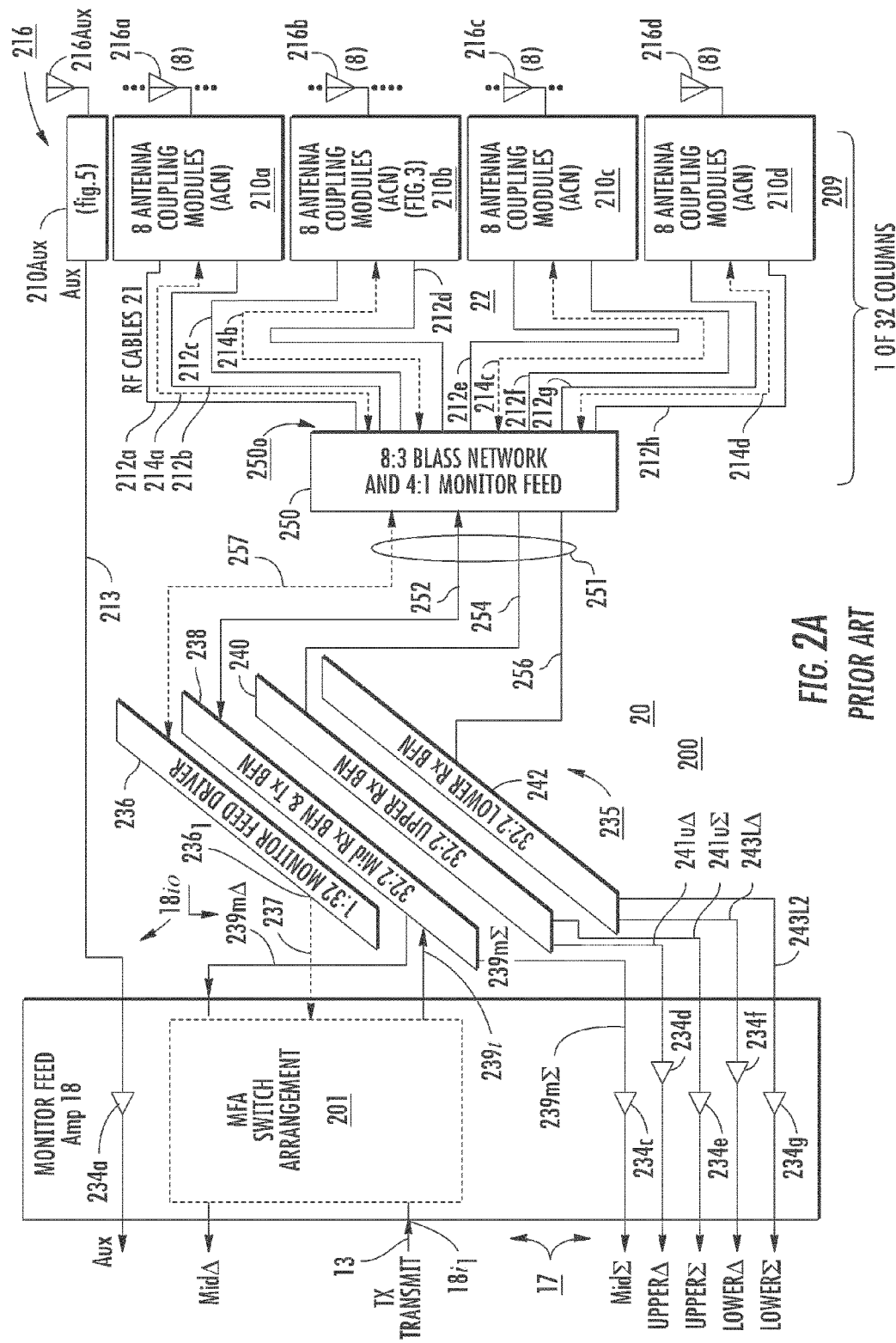
FIG. 2A is a more detailed representation of a portion of the radar of FIG. 1 including the monitor feed amplifier, beamformer, and antenna coupling modules of the active antenna array.
Figure 2B:
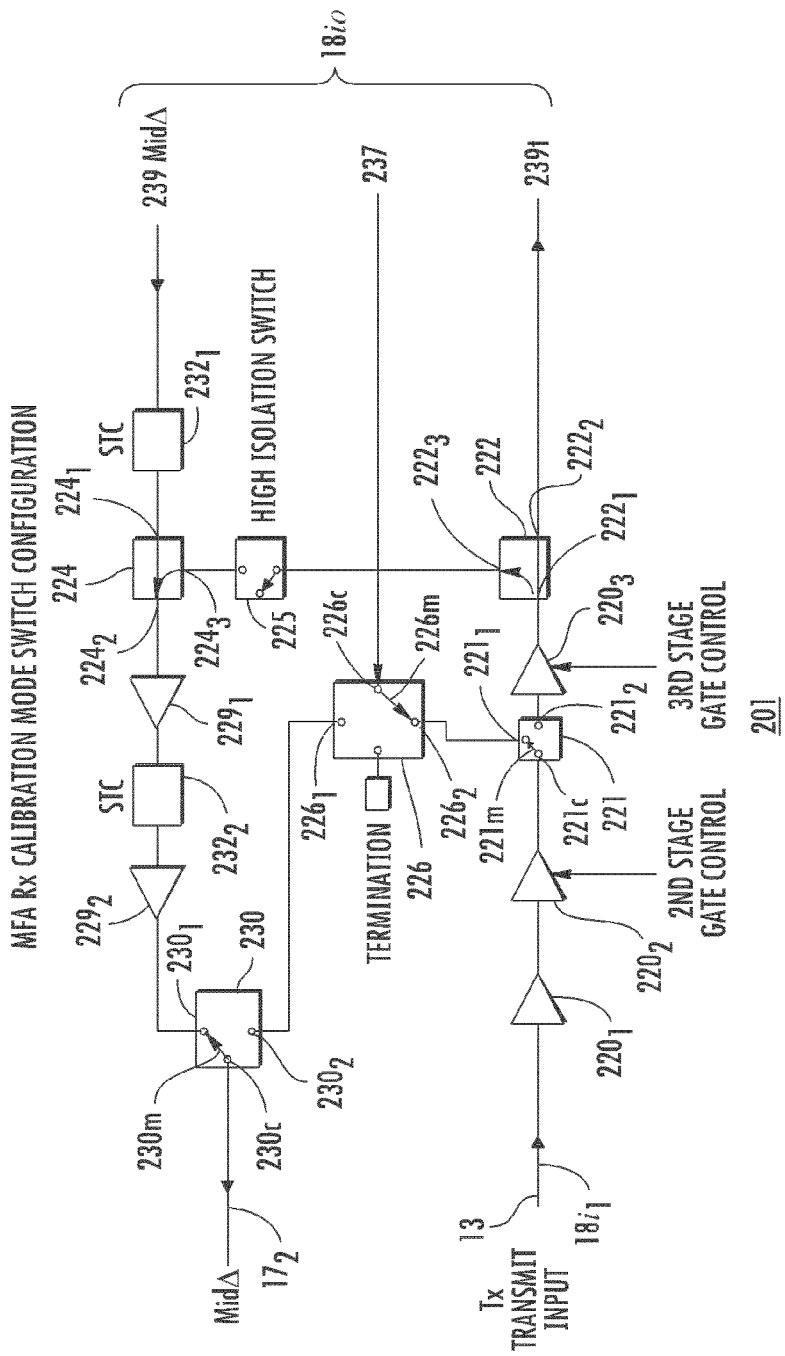
FIGS. 2B and 2C are simplified diagrams in block and schematic form illustrating details of the monitor feed amplifier of FIG. 2A in various operating states.
Figure 2C:
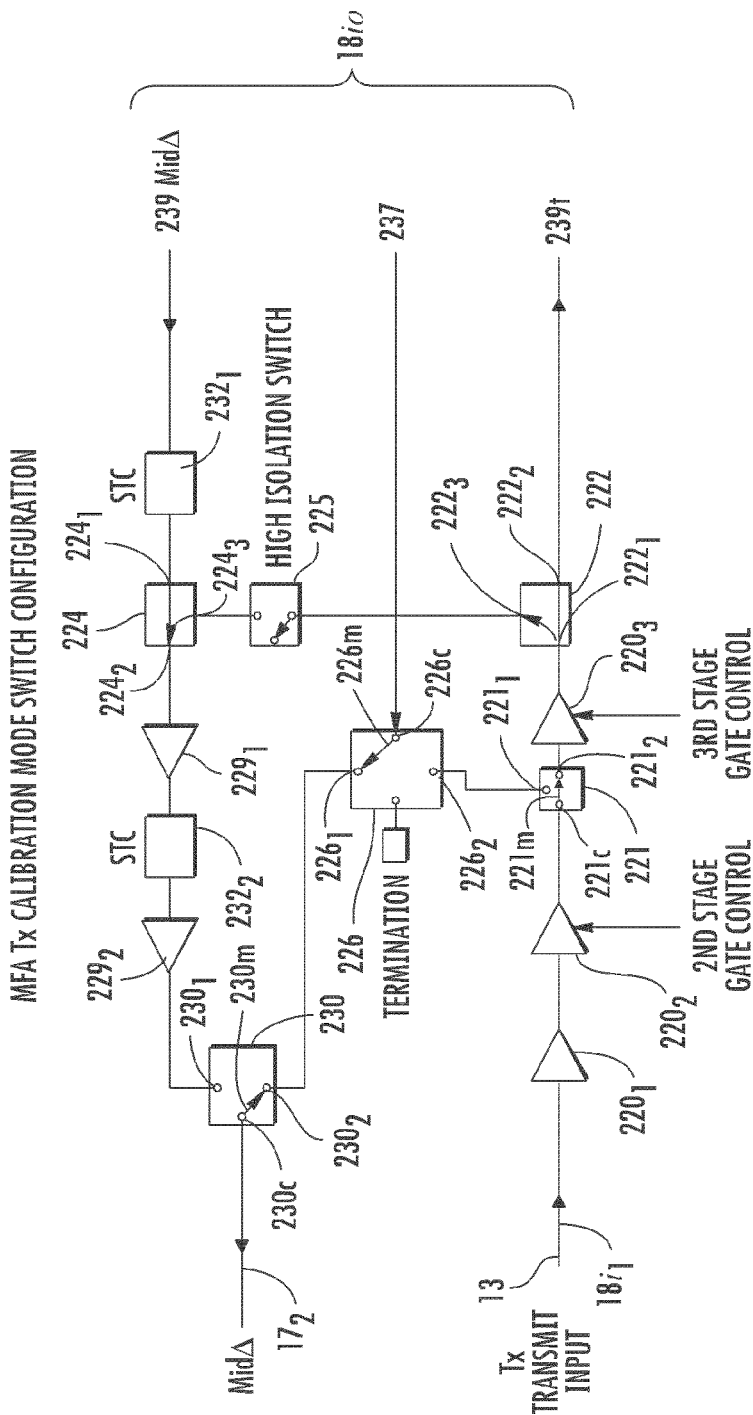
Figure 7:
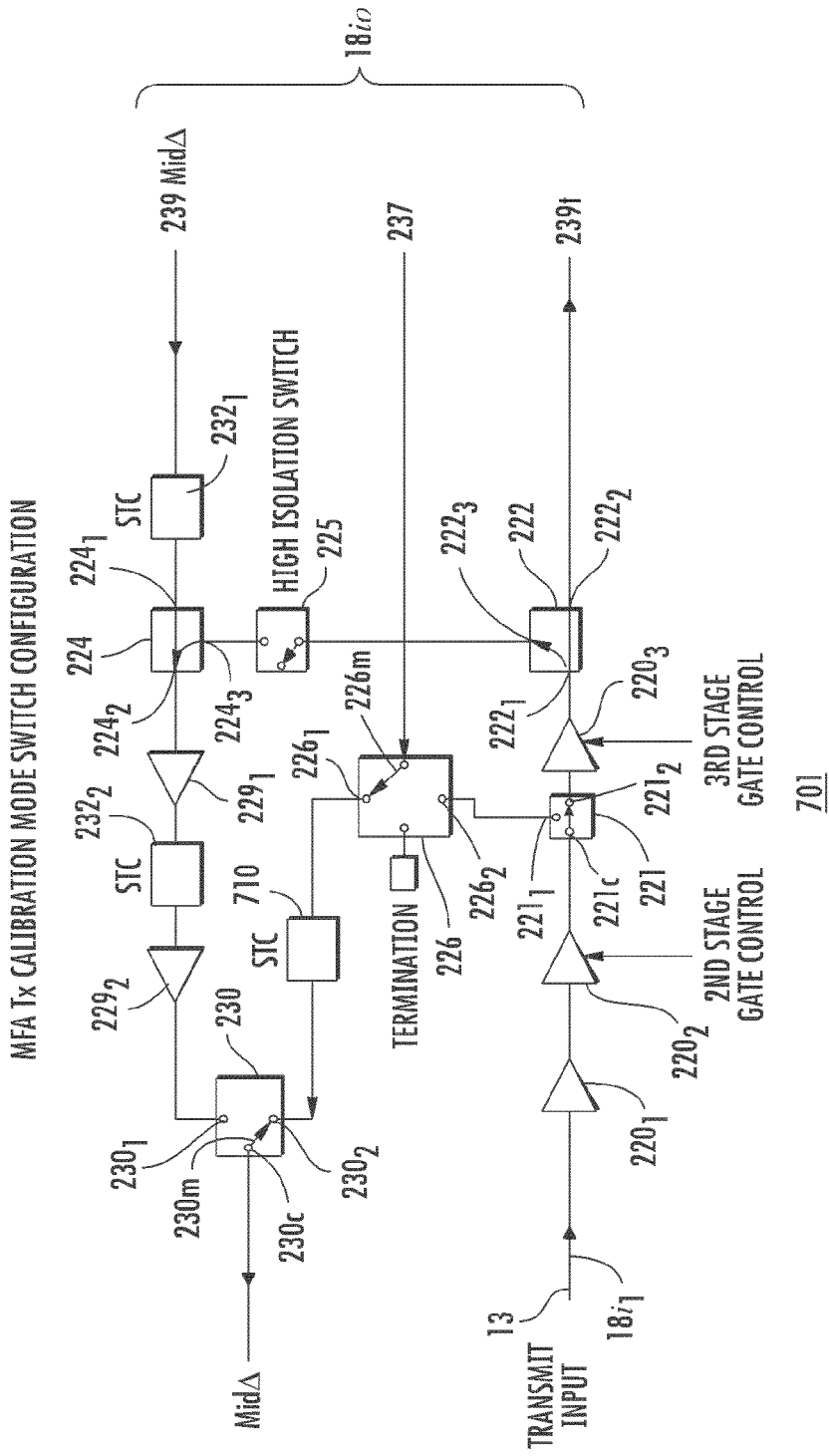
FIG. 7 is a simplified diagram in block and schematic form similar to FIG. 2C, showing modifications to the Monitor Feed Amplifier of the EQ36 to aid in the calibration according to an aspect of the invention.

According to an aspect of the invention, the prior-art structure of FIG. 2A is modified. More particularly, the monitor feed amplifier (MFA) 18 is modified to facilitate a method according to an aspect of the invention. FIG. 7 is a simplified diagram in block and schematic form of an MFA Switching Arrangement 201 (of FIGS. 2B and 2C) modified from that of FIGS. 2A and 2B, and given the designation 701 to make the distinction clear. Elements of FIG. 7 corresponding to those of FIGS. 2A and 2B are designated by the same reference alphanumerics. More particularly, FIG. 7 illustrates a modified MFA switching arrangement 201 structure in the transmit calibration mode, which provides for "STC-like" gain control of the transmit-calibration-mode signals entering the receiver. In FIG. 7, a further block 710 is interposed in the path between port $226_2$ of switch 226 and port $230_2$ of switch 230. Block 710 is thus positioned for STC-type control of transmit calibration signal arriving at the MFA 18 from the 1:32 Monitor Feed divider 236. In the prior-art arrangement of FIGS. 2B and 2C, only the receive calibration signal is subject to STC action. It must be understood that the modulation aspect of the STC blocks is controllable, as with most functions of the radar, in response to commands from the Radar Control Processor (14 of FIG. 1). Thus, the signals traversing the various STC blocks can be controllably modulated. In particular, the signals traversing some of the STC blocks are amplitude modulated under the control of the RCC.

Gain and phase changes imposed on the exciter signal in the TR module are well known for beamforming and beam steering. In the context of the invention, sinusoidal phase modulation may be accomplished by clocking-in from the radar control computer a discrete set of phase shifts arranged in a sinusoidal manner, and the new frequency of the forward calibration signal will be $d\theta/dt$.

Figures 4A, 4B:
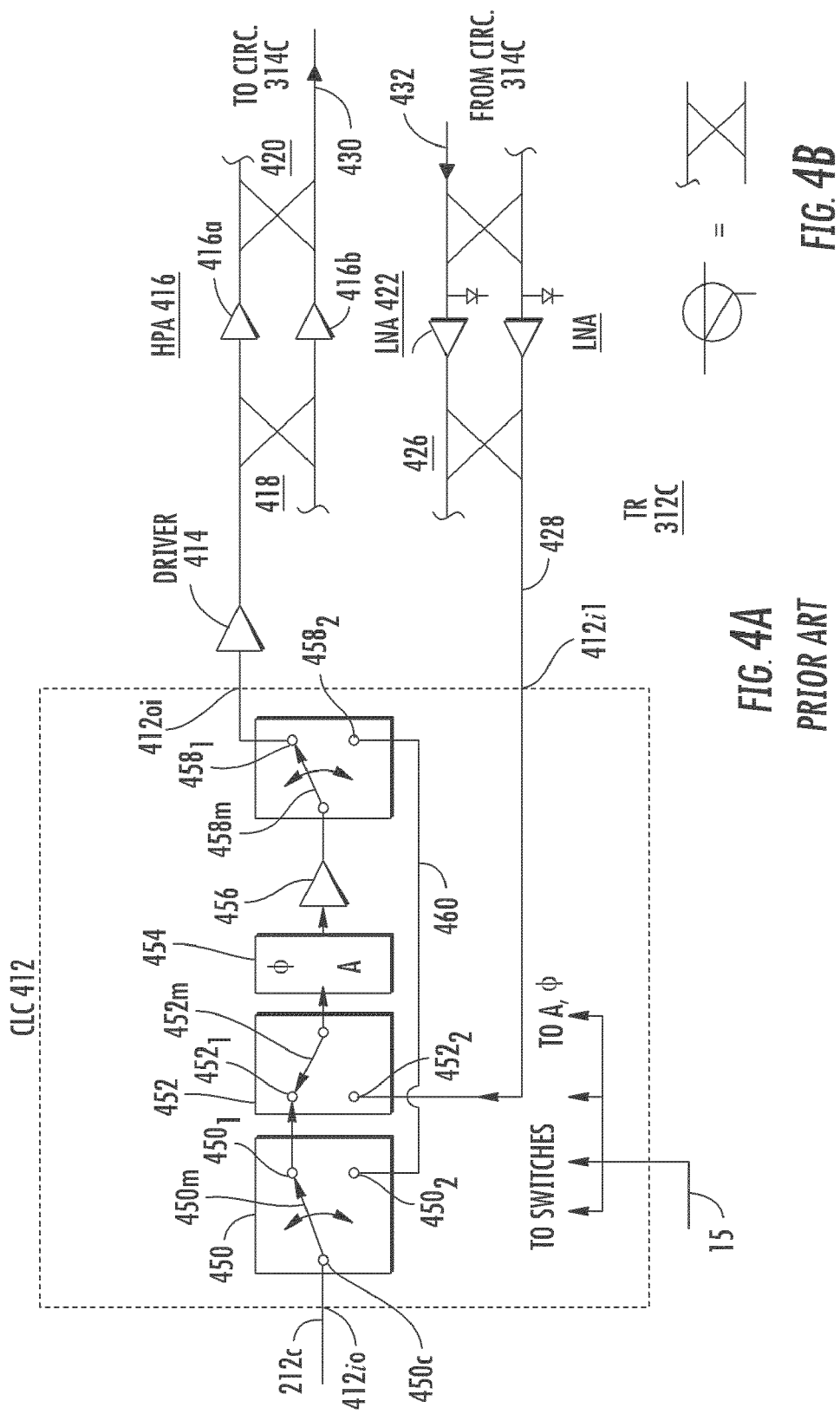
FIG. 4A is a simplified representation of details of one of the TR modules of FIG. 3.
FIG. 4B illustrates the correspondence of different symbols for directional couplers.
Figure 5:
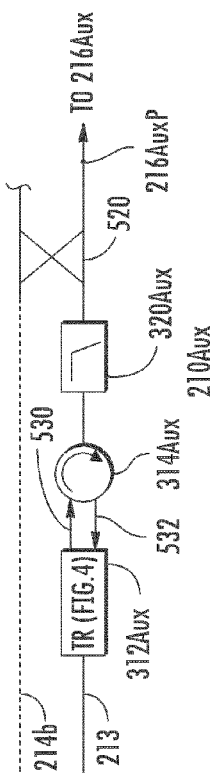
FIG. 5 is a simplified representation of details of an auxiliary TR module of FIG. 2A.
Figure 8:
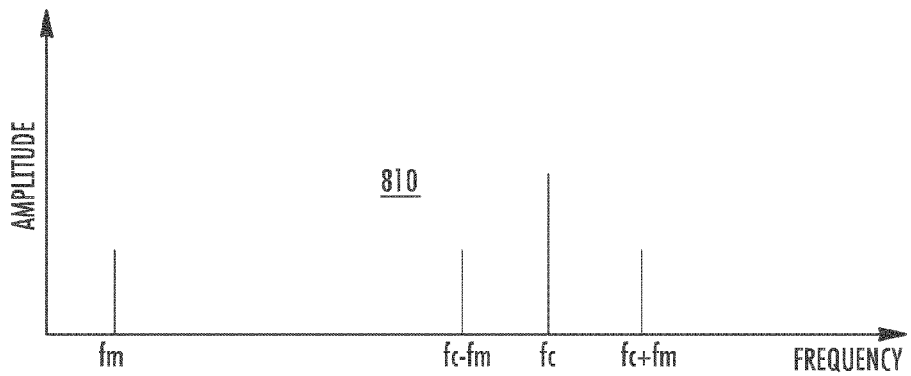
FIG. 8 is a spectrum plot of the result of amplitude modulation (AM)
Figure 9:
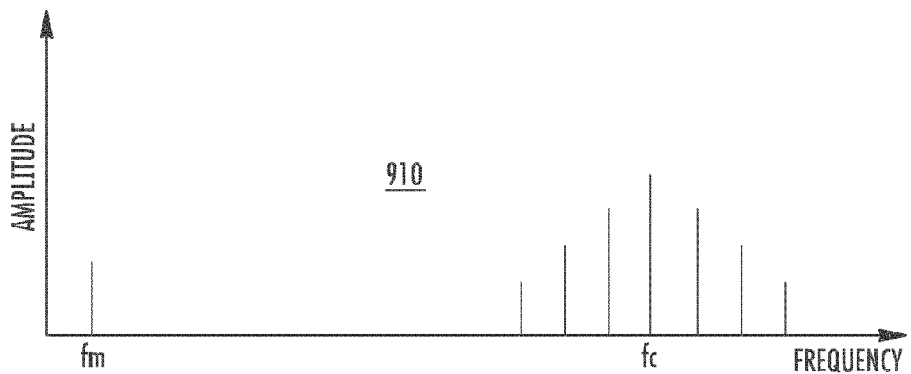
FIG. 9 is a spectrum plot of the result of frequency modulation (FM)
Figure 10:
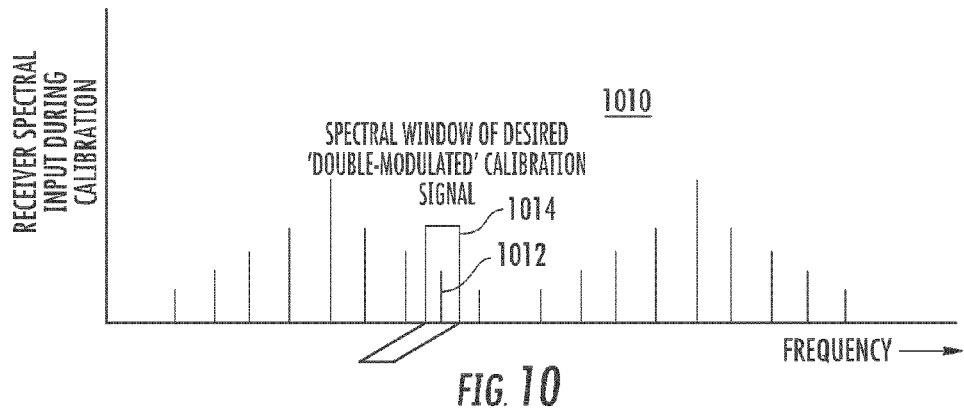
FIG. 10 is a spectrum plot of the result of "double modulation" by AM and FM.

According to an aspect of the invention, the calibration function of the various forward and reverse paths is accomplished by frequency-modulating calibration signals at certain locations in the radar, and amplitude-modulating calibration signals at certain other locations. The modulated signals are analyzed to identify the desired calibration signals among the leakage signals. More particularly, forward-direction calibration is accompanied by frequency-modulation (FM) of the forward-direction signal traversing the CLC (412 of FIG. 4) associated with the one of the antenna paths currently being calibrated. The frequency modulation of a fixed-frequency exciter signal by a modulation signal of fixed frequency $f_M$ results in a frequency spectrum such as 910 of FIG. 9. Thus, only that portion of the forward-direction exciter signal that ultimately reaches the "antenna" structure (as represented by the CLC) is frequency modulated, and it is that frequency modulated signal which starts the journey back to the receiver during calibration. The frequency modulation performed in the CLC is controlled by the radar control computer. The frequency-modulated signal returning to the modified Monitor Feed Amplifier of FIG. 7 is further amplitude modulated by the additional modulator represented by modulator or sensitivity time control (STC) block 410. The frequency spectrum resulting from amplitude modulation of a single-frequency carrier by a modulating signal $f_M$ is illustrated as 810 in FIG. 8. The plot 810 includes the modulation signal $f_M$, and the modulated exciter signal $f_C \pm f_M$. Thus, all signals traversing the MFA 18 in a direction toward the receiver are amplitude modulated. In calibration operation according to a mode of the invention, all the forward-flowing exciter signals which reach the octapack in the calibration mode are frequency modulated, and then return to the receiver 16 by way of the MFA 18. The calibration signals flowing to the receiver 16 through the MFA are amplitude modulated. FIG. 10 illustrates the frequency spectrum 1010 resulting from amplitude modulation of the previously frequency-modulated signal. The unwanted but unavoidable direct leakage from exciter to receiver (618 of FIG. 6) is neither frequency nor amplitude modulated. The unavoidable but unwanted leakage signals from the forward path to the reverse path, represented in FIG. 6 by paths 620, 622, 624, and 626, are amplitude-modulated by the additional or new STC function 710, but are not frequency modulated. Only those signals which reach the octapack (as represented by the CLCs of the antenna coupling units of set 310), are frequency modulated. These frequency modulated signals which are coupled back toward the receiver 16 by the directional couplers of set 320 are further amplitude modulated in the MFA. The electrical characteristics of the reference excitation are compared in the receiver with those of the doubly-modulated reverse-direction signals, to determine at least one of amplitude and phase of the forward path plus the precalibrated monitor reverse path. The value of the monitor reverse path characteristic is subtracted from the forward-plus-reverse path value to determine the electrical characteristics of the forward path(s) alone. The subtraction operations and the memorization of the resulting correction values can be performed in the radar control processor 14.

As mentioned, FIG. 10 illustrates the frequency spectrum 1010 resulting from amplitude modulation of the previously frequency-modulated signal. This frequency spectrum includes a spectral component illustrated as 1012 which is "doubly modulated" or subject to amplitude modulation following the frequency modulation. The receiver 16 of FIG. 1 is capable of "windowing" or bandpass filtering this doubly modulated signal, so as to exclude or ignore those signals which have not been doubly modulated. The bandpass filter window is illustrated as 1014 in FIG. 10. Thus, the direct leakage 618 from exciter 12 to receiver 16 is not modulated at all, and is ignored. That portion of the unwanted leakage which does not reach the octapack is subject only to amplitude modulation, and has a different spectral distribution than the correct calibration signal. The receiver windowing function 1014 rejects this component of the signal. Only that portion of the calibration signal which reaches the octapack and is frequency modulated, and returned toward the receiver, is subject to the "double modulation," and can be selected by the receiver window 1014.

The receiver 16 of FIG. 6, in the calibration mode, receives by leakage path 618 the leaked unmodulated excitation signal. It also receives the amplitude-modulated excitation signal which leaks through paths 620, 622, 624, and 626. Further, the receiver receives the composite-modulated excitation signal which flows through the desired signal path to the return path. FIG. 10 illustrates the composite modulation of the desired calibration signal as it is received at the receiver 16. The original exciter signal which arrives at the receiver is not of interest, and can be ignored. Similarly, the amplitude-modulated exciter signal is not of interest, and can be ignored. The only signal of interest is the doubly-modulated or composite-modulated signal. The frequency or frequency band of the desired calibration signal will depend upon the exact nature and frequencies of the plural modulations. An example of the desired doubly-modulated signal is illustrated as 1010 in the spectrum of FIG. 10. As mentioned, the receiver is capable of being tuned to any desired center frequency of interest, and with any bandwidth. It is easy to use the frequency and bandwidth control of the receiver to select the true calibration signal from among the desired and undesired signals.

In FIG. 7, a loop-back path extends from the forward-direction paths to the reverse-direction paths. More particularly, exciter signal flowing through directional coupler 222 produces a sample at port 222₃. The sample of the exciter signal appearing at port 222₃ can be coupled to the tap 224₃ of directional coupler 224 when switch 225 is CLOSED or conductive. Thus, the state of switch 224 is controlled during the calibration function so as to couple the sample of the exciter signal to the midΔ port of receiver 16 by way of port 224₃ of coupler 224, amplifier 229₁, STDC block 232₂, amplifier 229₂, and switch 230 (in its alternate state from that depicted in FIG. 7). This provides the receiver 16 with a reference sample of the exciter signal. To continue the calibration of the forward direction signal paths, the state of switches 225 and 230 is re-set to the state illustrated in FIG. 7. The receiver compares the characteristics of the doubly-modulated signal with the characteristics of the exciter signal as sampled through the loop-back path.

Figure 3:
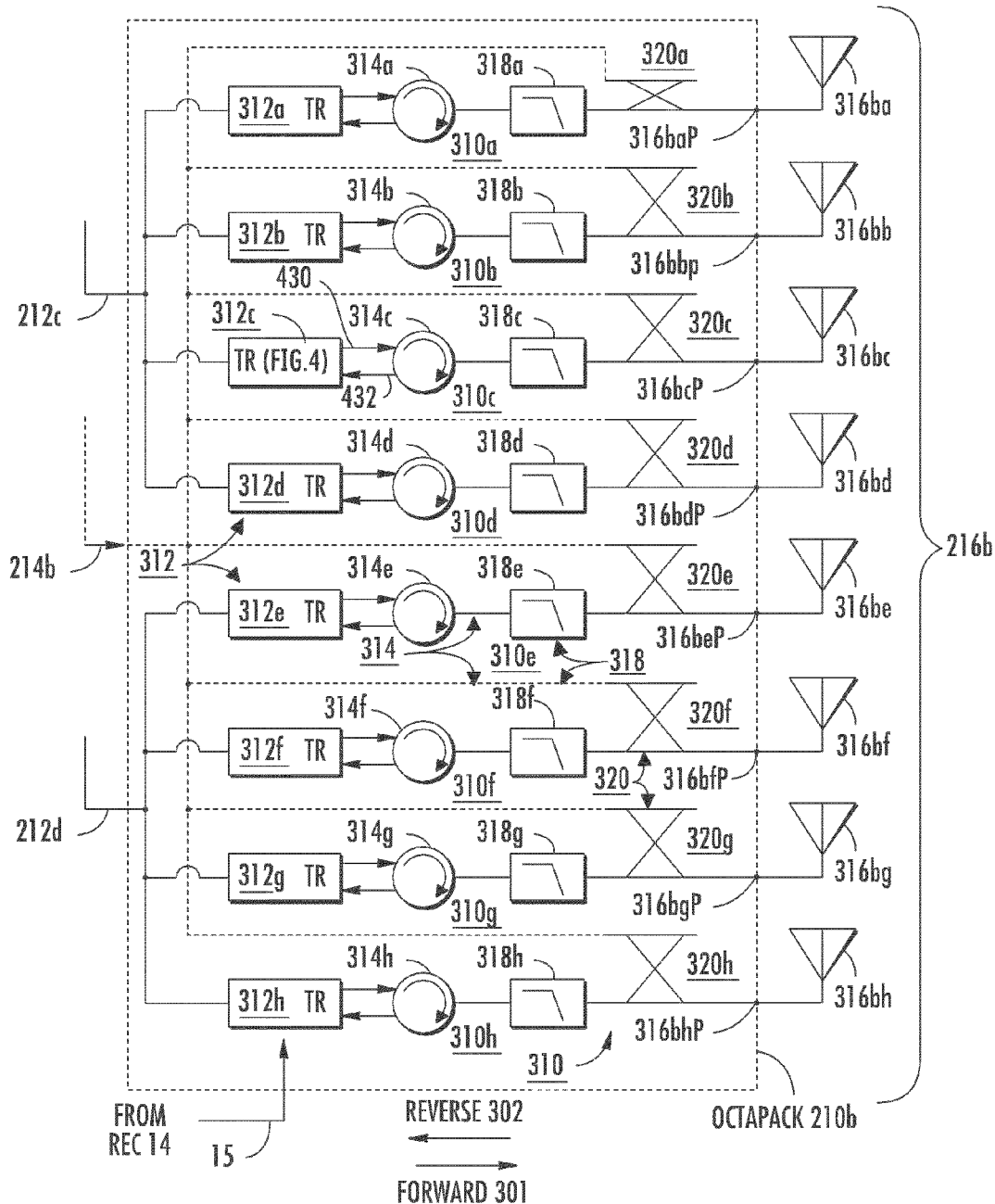
FIG. 3 is a simplified representation of details of antenna coupling modules of FIG. 2A, including TR modules.

The calibration of the forward paths continues with the switches set to the states illustrated in FIG. 7. The exciter (12 of FIG. 1) is excited, and produces signal which flows through path 13 and port 18i1 of FIG. 7, and through amplifiers 220₁ and 220₂, through switch 221 in the illustrated position, through amplifier 2203 and the through path of coupler 222 and by way of path 239t of FIG. 7 to 32:2 Mid RX BFN & TX BFN 238 (FIG. 2A). The exciter signal flowing from path 239t of FIG. 2A through 32:2 Mid RX BFN & TX BFN 238 flows by way of path 252 to 8:3 Blass Network and 4:1 Monitor Feed 250, and by way of paths 212a, 212b, 212c, . . . , to the set 209 of octapacks. Referring now to FIG. 3, the exciter signal enters the octapacks by way of exemplary path 212c and arrives at a TR module of set 312 of TR modules. It should be noted at this point that the forward signal paths can be individually made or broken within the TR modules by controlling the high power amplifiers therein. It should also be noted that the exciter signal(s) are frequency-modulated within the TR modules by controlled phase modulation in phase and amplitude control blocks 454. From each TR module, the frequency-modulated exciter signal circulates through a circulator of set 314 of circulators and thence to a filter of a set 318 of filters. The filtered frequency-modulated signals flow to a directional coupler of a set 320 of directional couplers. A portion of the exciter signal flows through the forward path of the relevant directional coupler of set 320 to the associated antenna, and is radiated as an incident of the calibration. A sample of the filtered, frequency-modulated forward-direction exciter signal is coupled by a directional coupler of set 320 of directional couplers onto a path 214 (path 214b in FIG. 3). This begins the flow of the frequency-modulated exciter signal back toward the receiver. The frequency-modulated exciter signal flows on a monitor feed path 214 (FIG. 2A) back to 8:3 Blass network & 4:1 Monitor Feed block 250, then by way of monitor feed path 257 to 1:32 Monitor Feed Divider 236, and monitor feed path 237 to MFA Switch Arrangement 201. Within MFA Switch Arrangement 201 (FIG. 7), the frequency-modulated exciter signal (together with unmodulated leakage signals) flows through switch 226 in the illustrated state to STC 710, where additional amplitude modulation is imposed, to produce doubly-modulated signal. The doubly-modulated signal is applied from STC 710 through switch 230 (in the illustrated state) to the MidΔ input port of receiver 16 (FIG. 1). The receiver thus receives reference exciter signal during a first phase of forward-direction calibration, and compares the amplitude and phase characteristics of the reference signal with the amplitude and phase of the doubly-modulated signal. This comparison can be made with the results substantially free of errors attributable to the unwanted leakages described in conjunction with FIG. 6. The known effects of the monitor feed paths can then be subtracted from the measured amplitude and phase characteristics of the forward-direction paths to determine the characteristics of each of the forward-direction paths, which effects can then be compensated for during normal radar transmit operation.

Additional calibration can be performed on the receive paths. As mentioned, a loop-back path exists within the MFA Switch Arrangement 201 by which the receiver 16 can sample the exciter signal. This loop-back path includes directional coupler 222, high-isolation switch 225, and directional coupler 224. In the receive calibration mode, the switches of the MFA Switch Arrangement 201 are initially configured to provide the receiver 16 with the exciter 12 signals as reference. The switches are then set to another mode of operation. These settings are illustrated in FIG. 2B. In this mode of operation, exciter signals are applied in a forward direction over the monitor feed paths to the CLC (412 of FIG. 4A), where they are frequency-modulated, and returned to the MFA Switch Arrangement 201, where they are amplitude modulated, and then sent to the receiver 12. More particularly, the exciter 12 signal is applied by way of path 13 and Monitor Feed Amplifier 18 input port 18i1 of FIG. 1 to amplifiers $220_1$, $220_2$, and to switch 221 in the state illustrated in FIG. 2B. The exciter signal is routed by switch 221 and switch 226 onto monitor feed path 237. In FIG. 2A, the exciter signals exit MFA Switch Arrangement 201 by monitor feed path 237, and flow through 1:32 Monitor Feed Divider 236, through monitor feed path 257 to 8:3 Blass and 4:1 Monitor Feed network 250 and set 214 of monitor feed paths to set 209 of the octapacks. The exciter signal arriving by way of path(s) 214 at the octapacks follows paths illustrated in FIG. 3. More particularly, the exciter signals flow to a tap of each one of the directional couplers of set 320 of directional couplers, and are coupled in each path to a filter of set 318, and circulate through a circulator of set 314 of circulators to a TR module of set 312 of TR modules. Within the TR modules (FIG. 4A), the exciter signals are applied to the low-noise amplifiers (LNA) 412, most of which are biased OFF to prevent multiple return signals. Only the signal in the path in question is applied to an active LNA, and the amplified signal is applied by way of path 428 to switch 452, which is controlled to the alternate state from that illustrated. The exciter signal is then applied to phase and amplitude control block 454, where it is frequency modulated. The frequency modulated signal is coupled by way of switch 458 (in its alternate state) by way of path 460 and switch 450 (in its alternate state) onto a return path 212 (212c illustrated). The frequency-modulated exciter signal flows on the selected one of the paths 212 through 8:3 Blass and 4:1 Monitor Feed Network 250 and paths 252 to 32:2 Mid Rx BFN & Tx BFN 238, thence by way of path 239 mΔ to MFA Switch Arrangement 201. Within MFA Switch Arrangement 201, the signal on path 239 mΔ flows by way of switch 226 (in the state illustrated in FIG. 7) to STC block 710. STC block 710 amplitude-modulates the returning frequency-modulated exciter signal to produce doubly-modulated signal. The doubly-modulated signal is coupled through switch 230 onto path midΔ and then the receiver 16. The receiver 16 performs the same comparisons of the reference exciter signal with the returned doubly-modulated signal as is described in conjunction with the transmit path calibration, to thereby determine the phase and amplitude characteristics of the return paths. Once these characteristics are known, the command phase and amplitude in the reception mode can be adjusted to compensate for the unwanted errors in the receive paths.

The calibration determines the amplitude and phase characteristics of the many signal paths extending from the exciter to the many antennas. Some of the signal paths, as mentioned, are monitor feed paths which are precalibrated, and which are represented by dash lines in FIGS. 2A and 3. A major advantage of calibration such as that described is that the calibration of most of the signal paths can be accomplished with only the equipment already existing in the radar or antenna system.

Thus, a method according to an aspect of the invention is for calibrating the transmit portion or aspect of an apparatus (10). The apparatus (10) includes an array antenna (210) which includes a plurality of guided-wave ports (such as 316bcP, for example). The array antenna (210) is for transducing electromagnetic signals (23) between guided and unguided modes. The apparatus (10) further includes an exciter (12) for generating RF excitation or excitation signals for calibration and operation of the apparatus. A first sampling coupler (222) includes a tap port ($222_3$) and an output port (222A. The first sampling coupler (222) is coupled to the exciter (12) for generating a local sample of the excitation at the tap port ($222_3$), and for passing most of the excitation to the output port ($222_2$) of the first sampling coupler (222). A tunable receiver (16) includes an input port (midΔ), which is controllably coupled (by switches 230 and 225) to the first sampling coupler (222) for receiving the local sample of the excitation. The receiver (16) has the capability of comparing at least the phase of the local sample of the excitation with calibration signals applied to the input port (midΔ) of the receiver (16). The apparatus also includes at least one phase modulator (14, 454) and at least one amplitude modulator (14, 710). A beamformer (20) includes a first port ($20io_1$) coupled to the output port ($222_2$) of the first sampling coupler (222), for receiving the excitation signals passing through the first sampling coupler (222) (and exiting the output port (222₂) from the exciter (12). The beamformer (20) also includes a plurality of second ports (250o) coupled to a plurality of signal paths (21), for distributing the excitation signals as forward excitation among the plurality of signal paths (21) to a phase modulator (14, 454; operated as a frequency modulator). The beamformer (20) also includes (precalibrated) monitor feed paths for coupling frequency-modulated excitation signals in a reverse direction (98) to the amplitude modulator (14, 710). A direction-reversing directional coupler (of set 320) is coupled to the phase modulator (14, 454) and to the beamformer (20) for propagating frequency modulated excitation in the reverse direction (98) through the monitor feed paths of the beamformer (20). The direction-reversing coupler (of set 320) also includes a port coupled to an antenna guided-wave port. The method comprises the steps of operating the exciter (12) to generate the excitation or excitation signals, whereby the excitation signals flow through the first sampling coupler (222) to produce reference excitation at the tap port (222₃) and to also produce forward (96) excitation (at output port 222₂). The reference excitation is coupled to the receiver (16). The forward (96) excitation is coupled through the beamformer (20) to the phase modulator (14, 454). The phase modulator (454) is controlled (14) to frequency modulate the excitation distributed thereto, to thereby produce the frequency-modulated excitation, which frequency-modulated excitation flows from the phase modulator (454) to the direction-reversing directional couplers (of set 320), and by way of the monitor feed paths (including path 257) of the beamformer (20) to the amplitude modulator (710). The excitation signals flowing through the amplitude modulator (710), including the frequency-modulated excitation signals, are amplitude-modulated, to thereby generate amplitude-modulated excitation signals, some of which are doubly-modulated (frequency modulated and then amplitude modulated) and some of which are not doubly-modulated. The amplitude-modulated excitation signals from the amplitude modulator (710) are coupled to the input port (midΔ) of the receiver (16). The receiver (16) is controlled (14) to respond (1014) to the doubly-modulated excitation signals (1012) and to not respond to the not-doubly-modulated excitation, and to compare electrical characteristics of the reference excitation and the doubly-modulated excitation to thereby produce forward-direction correction values. The apparatus (10) is operated in a transmit mode in which the phase modulators are commanded with values which are modified in response to, with or by the correction values. The step of coupling the reference excitation to the receiver (16) includes the step of operating switches (225, 230) to provide a path between the tap port (222₃) and the input port (midΔ) of the tunable receiver (16). In one mode of the method, the step of comparing electrical characteristics includes the step of subtracting from measured forward-plus-reverse characteristics the electrical characteristics of the monitor feed paths.

A method according to another aspect of the invention is for calibrating the receive aspect of an apparatus, where the apparatus (10) includes an array antenna (210) including a plurality of guided-wave ports (316bcP, for example). The array antenna (210) is for transducing electromagnetic signals (23) between guided and unguided modes. An exciter (12) generates RF calibration excitation or excitation signals for calibration of the apparatus. A first sampling coupler (222) includes a tap port (222₃) and an output port (222₂). The first sampling coupler (222) is coupled to the exciter (12) for generating a local sample of the calibration excitation at its tap port (222₃). A tunable receiver (16) includes an input port (midΔ) controllably coupled (by switches 230 and 225) to the tap port (222₃) of the first sampling coupler (222) for receiving the sample of the calibration excitation. The apparatus (10) includes at least one phase modulator (14, 454). A direction-reversing directional coupler (of set 320) includes a first through port coupled to an antenna guided-wave port (316bcP, for example) and a second through port coupled to the phase modulator (14, 454), and also includes a direction reversing port. The apparatus (10) also includes an amplitude modulator (14, 710). A beamformer (20) includes a forward-direction (96) monitor feed path (236₁, 236, 214) coupled to the exciter (12) and to the direction reversing port of the directional coupler (of set 320), for receiving the calibration excitation from the exciter and for distributing the excitation to the direction reversing port of the directional coupler (of set 320), the beamformer (20) also including a plurality of receive signal paths (for example 254, 239 mΔ) for coupling calibration excitation and receive signals in a reverse direction (98) to the amplitude modulator (14, 710). The method comprises the steps of operating the exciter (12) to generate the calibration excitation, whereby the calibration excitation flows through the first sampling coupler (222) to produce reference excitation at the tap port (222₃). The reference excitation is coupled from the first sampling coupler (222) to the port (midΔ) of the receiver (16). The calibration excitation signals are coupled in a forward direction (96) through monitor feed paths (such as 257) of the beamformer (20) to the direction-reversing port of the directional coupler (of set 320), for generating reverse-direction calibration excitation signals. The reverse-direction calibration excitation signals are applied to the phase modulator (14, 454). The phase modulator (454) is controlled (14) to frequency modulate the reverse-direction calibration excitation signals applied thereto, to thereby produce reverse-direction frequency-modulated calibration excitation signals. The reverse-direction frequency-modulated calibration excitation signals are coupled through a receive signal path of the beamformer (20), to the amplitude modulator (14, 710). The amplitude modulator (14, 710) is controlled (14) to amplitude-modulate calibration excitation signals flowing therethrough, including the frequency-modulated calibration excitation signals, to thereby generate amplitude-modulated calibration excitation signals, some of which are doubly-modulated (1012) and some of which are not doubly-modulated. The amplitude-modulated calibration excitation signals are coupled from the amplitude modulator (14, 710) to the input port (midΔ) of the receiver (16). The receiver (16) is controlled (14) to respond (1014) to the doubly-modulated excitation signals (1012) and to not respond to the not-doubly-modulated excitation, and to compare electrical characteristics of the reference excitation signals and the doubly-modulated excitation signals to thereby produce correction values. The apparatus (10) is operated in a receive mode in which the phase modulator (454) is commanded with values which are modified by the correction values. In a particular mode of the method, the correction values are modified by subtracting the characteristics of the forward monitor feed path.

What is claimed is:

1. A method for calibrating a the transmit aspect of an apparatus, said apparatus including:
    an array antenna including a plurality of guided-wave ports, said array antenna being for transducing electromagnetic signals between guided and unguided modes;
    an exciter for generating RF excitation for calibration and operation of the apparatus;
    a first sampling coupler including a tap port and an output port, said first sampling coupler being coupled to said exciter for generating a local sample of said excitation at said tap port, and for passing a portion of said excitation to said output port of said first sampling coupler;

a tunable receiver including an input port controllably coupled to said first sampling coupler for receiving said sample of said excitation, said receiver having the capability of comparing at least the phase of said sample of said excitation with calibration signals applied to said input port of the receiver;

at least one phase modulator;

at least one amplitude modulator;

a beamformer including a first port coupled to said output port of said first sampling coupler, for receiving said excitation passing through said first sampling coupler from said exciter, said beamformer also including a plurality of second ports coupled to a plurality of signal paths for distributing said excitation as forward excitation among said plurality of signal paths to said phase modulator, said beamformer also including monitor feed paths for coupling frequency-modulated excitation signals in a reverse direction to said amplitude modulator;

a direction-reversing directional coupler coupled to said phase modulator and to said beamformer for propagating frequency modulated excitation in said reverse direction through said monitor feed paths of said beamformer, said direction-reversing coupler also including a port coupled to an antenna guided-wave port;

said method comprising the steps of:

operating said exciter to generate said excitation, whereby said excitation flows through said first sampling coupler to produce reference excitation at said tap port and to also produce forward excitation;

coupling said reference excitation to said receiver;

coupling said forward excitation through said beamformer to said phase modulator;

controlling said phase modulator to frequency modulate said excitation distributed thereto, to thereby produce said frequency-modulated excitation, which frequency-modulated excitation flows from said phase modulator to said direction-reversing directional couplers, and by way of said monitor feed paths of said beamformer to said amplitude modulator;

amplitude-modulating said excitation signals, including said frequency-modulated excitation signals, flowing through said amplitude modulator, to thereby generate amplitude-modulated excitation signals, a portion of which are doubly-modulated and a portion of which are not doubly-modulated;

coupling amplitude-modulated excitation signals from said amplitude modulator to said input port of said receiver;

controlling said receiver to respond to said doubly-modulated excitation signals and to not respond to said not-doubly-modulated excitation, and to compare electrical characteristics of said reference excitation and said doubly-modulated excitation to thereby produce forward-direction correction values; and operating said apparatus in a transmit mode in which said phase modulators are commanded with values which are modified with said correction values.

2. A method according to claim 1, wherein said step of controlling said receiver to compare electrical characteristics includes the step of subtracting an electrical characteristic of said monitor feed paths from a corresponding electrical characteristic of the monitor feed path and the forward-direction path.

3. A method according to claim 2, wherein said step of coupling said reference excitation to said receiver includes the step of operating switches to provide a path between said tap port and said input port of said tunable receiver.

4. A method for calibrating a receive aspect of an apparatus, said apparatus including:

an array antenna including a plurality of guided-wave ports, said array antenna being for transducing electromagnetic signals between guided and unguided modes;

an exciter for generating RF calibration excitation for calibration of the apparatus;

a first sampling coupler including a tap port and an output port, said first sampling coupler being coupled to said exciter for generating a local sample of said calibration excitation at said tap port;

a tunable receiver including an input port controllably coupled to said first sampling coupler for receiving said sample of said calibration excitation;

at least one phase modulator;

a direction-reversing directional coupler including a first through port coupled to an antenna guided-wave port and a second through port coupled to said phase modulator, and also including a direction reversing port;

an amplitude modulator;

a beamformer including a forward-direction monitor feed path coupled to said exciter and to said direction reversing port of said directional coupler, for receiving said calibration excitation from said exciter and for distributing said excitation to said direction reversing port of said directional coupler, said beamformer also including a plurality of receive signal paths for coupling calibration excitation and receive signals in a reverse direction to said amplitude modulator;

said method comprising the steps of:

operating said exciter to generate said calibration excitation, whereby said calibration excitation flows through said first sampling coupler to produce reference excitation at said tap port;

coupling said reference excitation from said first sampling coupler to said port of said receiver;

coupling said calibration excitation signals in a forward direction through monitor feed paths of said beamformer to said direction-reversing port of said directional coupler, for generating reverse-direction calibration excitation signals;

applying said reverse-direction calibration excitation signals to said phase modulator;

controlling said phase modulator to frequency modulate said reverse-direction calibration excitation signals applied thereto, to thereby produce frequency-modulated calibration excitation signals;

coupling said frequency-modulated calibration excitation signals through a receive signal path of said beamformer, to said amplitude modulator;

controlling said amplitude modulator to amplitude-modulate calibration excitation signals flowing therethrough, including said frequency-modulated calibration excitation signals, to thereby generate amplitude-modulated calibration excitation signals, some of which are doubly-modulated and some of which are not doubly-modulated;

coupling amplitude-modulated calibration excitation signals from said amplitude modulator to said input port of said receiver;

controlling said receiver to respond to said doubly-modulated excitation signals and to not respond to said not-doubly-modulated excitation, and to compare electrical characteristics of said reference excitation signals and said doubly-modulated excitation signals to thereby produce reverse-direction correction values; and operating said apparatus in a receive mode in which said phase modulator is commanded with values which are modified with said correction values.

5. A method for calibrating a transmit aspect of an apparatus, said method comprising the steps of:

operating an exciter to generate RF excitation to produce reference excitation and forward excitation;

coupling said forward excitation through a beamformer to a phase modulator;

controlling said phase modulator to produce frequency-modulated excitation;

amplitude-modulating said frequency-modulated excitation to generate amplitude-modulated excitations, a portion of which are doubly-modulated and a portion of which are not doubly-modulated;

controlling said receiver to respond to said doubly-modulated excitations and to not respond to said not-doubly-modulated excitations, and to compare electrical characteristics of said reference excitation and said doubly-modulated excitations to thereby produce forward-direction correction values; and operating said apparatus in a transmit mode in which said phase modulator is commanded with values which are modified with said correction values.

6. A method for calibrating a receive aspect of an apparatus, said method comprising the steps of:

operating an exciter to generate calibration excitation to produce reference excitation;

coupling said calibration excitation in a forward direction through monitor feed paths of a beamformer to a direction-reversing port of a directional coupler, to generate reverse-direction calibration excitation;

applying said reverse-direction calibration excitation to a phase modulator;

controlling said phase modulator to produce frequency-modulated calibration excitations;

coupling said frequency-modulated calibration excitations through a receive signal path of said beamformer, to said amplitude modulator;

controlling said amplitude modulator to amplitude-modulate said frequency-modulated calibration excitations, to generate amplitude-modulated calibration excitations, a portion of which are doubly-modulated and a portion of which are not doubly-modulated;

controlling said receiver to respond to said doubly-modulated excitations and to not respond to said not-doubly-modulated excitations, and to compare electrical characteristics of said reference excitation and said doubly-modulated excitations to produce reverse-direction correction values; and operating said apparatus in a receive mode in which said phase modulator is commanded with values which are modified with said correction values.

7. A system for calibrating a transmit aspect of an apparatus, said system comprising:

a processor executing instructions for performing the steps of:

operating an exciter to generate RF excitation to produce reference excitation and forward excitation;

coupling said forward excitation through a beamformer to a phase modulator;

controlling said phase modulator to produce frequency-modulated excitation;

amplitude-modulating said frequency-modulated excitation to generate amplitude-modulated excitations, a portion of which are doubly-modulated and a portion of which are not doubly-modulated;

controlling said receiver to respond to said doubly-modulated excitations and to not respond to said not-doubly-modulated excitations, and to compare electrical characteristics of said reference excitation and said doubly-modulated excitations to thereby produce forward-direction correction values; and operating said apparatus in a transmit mode in which said phase modulator is commanded with values which are modified with said correction values.

8. A system for calibrating a receive aspect of an apparatus, said system comprising:

a processor executing instructions for performing the steps of:

operating an exciter to generate calibration excitation to produce reference excitation;

coupling said calibration excitation in a forward direction through monitor feed paths of a beamformer to a direction-reversing port of a directional coupler, to generate reverse-direction calibration excitation;

applying said reverse-direction calibration excitation to a phase modulator;

controlling said phase modulator to produce frequency-modulated calibration excitations;

coupling said frequency-modulated calibration excitations through a receive signal path of said beamformer, to said amplitude modulator;

controlling said amplitude modulator to amplitude-modulate said frequency-modulated calibration excitations, to generate amplitude-modulated calibration excitations, some of which are doubly-modulated and some of which are not doubly-modulated;

controlling said receiver to respond to said doubly-modulated excitations and to not respond to said not-doubly-modulated excitations, and to compare electrical characteristics of said reference excitation and said doubly-modulated excitations to produce reverse-direction correction values; and operating said apparatus in a receive mode in which said phase modulator is commanded with values which are modified with said correction values.

* * * * *

UNITED STATES PATENT AND TRADEMARK OFFICE
CERTIFICATE OF CORRECTION

| | | |
|---|---|---|
| PATENT NO. | : 7,982,664 B1 | Page 1 of 1 |
| APPLICATION NO. | : 12/472864 | |
| DATED | : July 19, 2011 | |
| INVENTOR(S) | : Michael B. Uscinowicz | |

It is certified that error appears in the above-identified patent and that said Letters Patent is hereby corrected as shown below:

Col. 20 line 58, the word "thereby" should be deleted.

Signed and Sealed this
Thirtieth Day of August, 2011

David J. Kappos
*Director of the United States Patent and Trademark Office*